United States Patent
Ikeda

(10) Patent No.: US 7,454,229 B2
(45) Date of Patent: Nov. 18, 2008

(54) ELECTRONIC APPARATUS AND WIRELESS COMMUNICATION TERMINAL

(75) Inventor: Masayuki Ikeda, Shiojiri (JP)

(73) Assignee: Seiko Epson Corporation (JP)

(*) Notice: Subject to any disclaimer, the term of this patent is extended or adjusted under 35 U.S.C. 154(b) by 153 days.

(21) Appl. No.: 10/591,206

(22) PCT Filed: Jul. 5, 2005

(86) PCT No.: PCT/JP2005/012728

§ 371 (c)(1),
(2), (4) Date: Aug. 31, 2006

(87) PCT Pub. No.: WO2006/004220

PCT Pub. Date: Jan. 12, 2006

(65) Prior Publication Data

US 2007/0184874 A1    Aug. 9, 2007

(30) Foreign Application Priority Data

Jul. 6, 2004  (JP) .............................. 2004-199421
Dec. 20, 2004 (JP) .............................. 2004-367203

(51) Int. Cl.
*H04M 1/00* (2006.01)
(52) U.S. Cl. .................. 455/553.1; 455/127.4
(58) Field of Classification Search ............... 455/553.1
See application file for complete search history.

(56) References Cited

U.S. PATENT DOCUMENTS

| 5,223,849 A | * | 6/1993 | Kasevich et al. ............ 343/895 |
| 5,231,346 A | * | 7/1993 | Gassmann .................... 324/95 |
| 5,844,525 A | * | 12/1998 | Hayes et al. ................. 343/702 |
| 6,075,500 A | * | 6/2000 | Kurz et al. ................... 343/895 |
| 6,218,991 B1 | * | 4/2001 | Sanad ................. 343/700 MS |
| 6,239,749 B1 | * | 5/2001 | Tzuang et al. ......... 343/700 MS |
| 6,259,407 B1 | * | 7/2001 | Tran .................... 343/700 MS |
| 6,271,796 B1 | * | 8/2001 | Itoh et al. .................... 343/702 |
| 6,424,820 B1 | * | 7/2002 | Burdick et al. ............. 455/41.1 |

(Continued)

FOREIGN PATENT DOCUMENTS

EP      1199842 A       4/2002

(Continued)

OTHER PUBLICATIONS

Search Report for PCT/JP2005/012728, ISA/EP, Rijswijk, mailed Oct. 17, 2005.

(Continued)

*Primary Examiner*—Matthew Anderson
*Assistant Examiner*—Hai V Nguyen
(74) *Attorney, Agent, or Firm*—Harness, Dickey & Pierce, P.L.C.

(57) ABSTRACT

In an electronic apparatus which is equipped with a first transmission unit for performing a first communication by an electromagnetic wave; a second transmission unit for performing a second communication by an electromagnetic wave; and a reception unit for receiving a signal transmitted from the second transmission unit, the electronic apparatus is comprised of an antenna arranged by a radiator having a size which is smaller than $1/(2\pi)$ of a wavelength of a use electromagnetic wave, which is connected to at least the second transmission unit and the reception unit.

7 Claims, 12 Drawing Sheets

U.S. PATENT DOCUMENTS

| | | | |
|---|---|---|---|
| 6,466,176 B1* | 10/2002 | Maoz et al. | 343/767 |
| 6,535,170 B2* | 3/2003 | Sawamura et al. | 343/702 |
| 6,640,113 B1 | 10/2003 | Shim et al. | |
| 6,683,575 B2* | 1/2004 | Sekine et al. | 343/702 |
| 6,765,536 B2* | 7/2004 | Phillips et al. | 343/702 |
| 6,795,028 B2* | 9/2004 | Stutzman et al. | 343/702 |
| 6,822,611 B1* | 11/2004 | Kontogeorgakis et al. | 343/702 |
| 6,845,253 B1* | 1/2005 | Schantz | 455/575.7 |
| 6,859,180 B1* | 2/2005 | Rivera | 343/709 |
| 6,895,255 B1* | 5/2005 | Bridgelall | 455/552.1 |
| 6,911,944 B2* | 6/2005 | Sekine et al. | 343/702 |
| 6,963,310 B2* | 11/2005 | Horita et al. | 343/702 |
| 7,009,567 B2* | 3/2006 | Iwai et al. | 343/702 |
| 7,023,389 B2* | 4/2006 | Demicco et al. | 343/702 |
| 7,034,750 B2* | 4/2006 | Asakura et al. | 343/700 MS |
| 7,053,846 B2* | 5/2006 | Parsche | 343/749 |
| 7,102,578 B2* | 9/2006 | Minemura | 343/702 |
| 7,164,386 B2* | 1/2007 | Baliarda et al. | 343/700 MS |
| 7,202,822 B2* | 4/2007 | Baliarda et al. | 343/700 MS |
| 7,245,950 B2* | 7/2007 | Iwai et al. | 455/575.7 |
| 7,253,426 B2* | 8/2007 | Gorrell et al. | 250/200 |
| 7,283,853 B2* | 10/2007 | Kanazawa et al. | 455/575.1 |
| 2001/0018351 A1 | 8/2001 | HIno et al. | |
| 2002/0175872 A1* | 11/2002 | Apostolos | 343/749 |
| 2002/0180648 A1* | 12/2002 | Boyle et al. | 343/702 |
| 2002/0183013 A1* | 12/2002 | Auckland et al. | 455/73 |
| 2003/0142019 A1* | 7/2003 | Hilgers | 343/700 MS |
| 2004/0145529 A1* | 7/2004 | Iguchi et al. | 343/702 |
| 2005/0088352 A1* | 4/2005 | Parsche | 343/749 |
| 2005/0192048 A1 | 9/2005 | Bridgelall | |
| 2005/0264453 A1* | 12/2005 | Baliarda et al. | 343/700 MS |
| 2006/0097927 A1* | 5/2006 | Satoh et al. | 343/702 |
| 2006/0232492 A1* | 10/2006 | Sawatani | 343/893 |
| 2007/0085039 A1* | 4/2007 | Gorrell et al. | 250/494.1 |
| 2007/0225053 A1* | 9/2007 | Iwai et al. | 455/575.7 |

FOREIGN PATENT DOCUMENTS

| | | |
|---|---|---|
| EP | 1128644 A | 7/2002 |
| JP | 04-025046 | 1/1992 |
| JP | 08-046416 | 2/1996 |
| JP | 10-256478 | 9/1998 |
| JP | 2000-012406 | 1/2000 |
| JP | 2000-068904 | 3/2000 |
| JP | 2000-124406 | 4/2000 |
| JP | 2003-101320 | 4/2003 |
| JP | 2003-218315 | 7/2003 |
| JP | 2004-343265 | 12/2004 |

OTHER PUBLICATIONS

Written Opinion of the International Searching Authority for PCT/JP2005/012728, PCT/ISA/237 (in English), ISA/EP, Rijswijk, mailed Oct. 17, 2005.

Chu, L. J., "Physical Limitations of Omni-Directional Antennas," Journal of Applied Physics, vol. 19, Dec. 1948, pp. 1163-1175.

Nikkei Microdevice, Dec. 2003, p. 161.

Mclean, J.S., "A Re-Examination of the Fundamental Limits on the Radiation Q of Electrically Small Antennas," IEEE Trans. Antennas Propagation, vol. 44, pp. 672-676, 1996.

* cited by examiner

ELECTRONIC APPARATUS AND WIRELESS COMMUNICATION TERMINAL

CROSS REFERENCE TO RELATED APPLICATIONS

This application is a 371 National Stage Application of International Application No. PCT/JP20051012728, filed Jul. 5, 2005. This application claims the benefit of Japanese Application No.2004-199421, filed Jul. 6, 2004 and Japanese Application No.2004-367203, filed Dec. 20, 2004. The disclosure(s) of the above applications are incorporated herein by reference.

FIELD OF THE INVENTION

The present invention is related to an electronic apparatus and a wireless communication terminal, which contain elements such as display elements and imaging elements of portable telephones and the like, and also are equipped with communication functions, while these elements require high-speed data transmissions.

BACKGROUND ART

Very recently, while functions owned by portable telephones, notebook type computers, digital cameras, and the like are conspicuously improved, high resolution and high precision are strongly required for display elements and imaging elements which are built in these electronic appliances, so that the structures of these electronic appliances become more complex. In particular, portable telephones are strongly required to be made compact and in light weight as well as in low cost, and also required to be operable in low consumption, while camera functions are required to be built in these portable telephones and sizes of display units of the portable telephones are required to be increased. As to housing structures of these portable telephones, folded type housings called as "clam shell type housings" and "flip type housings" have been mainly employed.

Currently, in electronic apparatus containing these display member elements and imaging elements, strong demands are considerably made to manufacture large-sized display units with high resolution, and further, to make these electronic appliance compact and in light weight. In response to these demands, there are many possibilities that element mounting boards of these electronic appliances are divided into plural sub-boards. In this case, there are many opportunities that electronic circuits are separated to a display member side and a control side. Under such a circumstance, lengths of wiring lines for connecting CPUs to either display elements or imaging elements are necessarily increased. Since resolution of display elements is increased, frequencies of signals transmitted through these line paths are increased, so that electrical connections between these electronic elements gradually become difficult.

More specifically, in clam shell type structure, CPUs are connected to either display elements or imaging elements via narrow hinge portions. Since the resolution as to these display elements and imaging elements is increased, amounts of data transmitted/received between both boards are also increased, so that high-speed data transfer techniques are required. To solve this problem, as high-speed data transfer systems, for instance, such a technical idea that LVDS (Low Voltage Differential Signaling) is used to connect either a display member or an imaging element has been proposed (Japanese Patent No. 3086456 (column 44), and Japanese Patent No. 3330359 (column 46)). Moreover, Japanese Patent No. 3349426 and Japanese Patent No. 3349490 have proposed the new methods, since the above-described LVDS technical idea cannot sufficiently solve the problem.

On the other hand, while great progress appears in semiconductor manufacturing techniques, there are such trends that integration degrees are considerably increased as a system-on-chip, and thus, all of semiconductor circuits which are storable within a single chip are mounted on this single semiconductor chip. As a result, a total number of pins used to connect semiconductor chips to external circuits are considerably increased, and occasionally exceeds several hundreds of connection pins. On the other hand, while operating frequencies of semiconductor circuits are similarly increased, the conventional connecting method for connecting the semiconductor circuit to the external unit via the wire bonding may cause a problem as to high frequency characteristics, and also may cause another problem that signals can be hardly transmitted/received between the semiconductor circuit and the external unit. With respect to such a problem, several researching reports have been made in which semiconductor chips are mutually connected by way of wireless manners, or circuit blocks are mutually connected by way of wireless methods in Japanese magazine "NIKKEI MICRODEVICE" issued in Dec. 2003, page 161; JP-A-10-256478; JP-A-2000-124406; JP-A-2000-68904; and JP-A-2003-101320.

However, as to recent large screen sizes of display members, even when these technical ideas are executed, sufficiently satisfiable performance could not be obtained. In other words, in small-signal serial transfer operations such as LVDS, very delicate designs as well as adjustments are required in order to achieve sufficiently satisfiable noise with standing characteristics (interference with standing characteristics and characteristics capable of avoiding applications of interference). In the LVDS technique, since amplitudes of signals are small, digital ICs necessarily handle analog signals. As a result, there is a problem that power consumption is increased. Also, in order to transmit signals in high precision, well-matched impedance terminations are required in the LVDS technique. However, there are a large number of signal lines which require the impedance terminations, and transfer impedances are low, e.g., 100 ohms. Accordingly, there is another problem that electric power consumed in these terminating resistances becomes not allowable values, namely becomes high.

Furthermore, in such a case that wiring lines pass through movable portions such as hinge portions, since characteristic impedances are changed due to bending degrees of these movable portions, an impedance mismatching phenomenon may occur in response to conditions, and thus, signal deteriorations may be induced because of reflections at the bending portions. As a consequence, there are other problems that speeds of data to be transferred are restricted, and/or limitations are made as to mounting methods and arrangements of components.

In addition, as apparent from the foregoing descriptions, since a total number of signals transmitted/received via the hinge portions amounts to several tens of signal lines, and wiring lines formed on boards cannot be used, flexible boards are connected to each other via connectors. There is such a drawback that the use of such a flexible board and the connection by such a connector cause high cost, and further, connection reliability is low.

Furthermore, increasing of wiring lines required for transferring data in high speeds requires physical spaces used for these wiring lines. Apparently, a large limitation is made of designs for electronic appliances.

In addition, when such large amounts of data are transferred in high speeds by using long wiring lines, if electromagnetic fields radiated from signal lines are increased, then this may cause electromagnetic interferences which are given to other electronic appliances, or the own electronic appliances. While amplitude levels at signal reception terminals have been defined in rules in signal transfer operation by the conventional signal lines, even if sufficiently high qualities are secured at the signal reception terminals, the amplitude levels of the signals cannot be lowered. In other words, EMI measures cannot be satisfactorily taken, so that this may cause designs of electronic appliances to be restricted, and may cause cost of these electronic appliances to be increased. Also, since electronic circuits on the transmission side are driven, loads on the signal reception terminals and stray capacitances of line lines are driven at the same time, so that extra energy is necessarily required so as to transfer signals. That is to say, this may increase power consumption.

These problems may be entirely solved if the conventional wireless communication techniques are conducted to communications executed among the respective blocks of electronic circuits and integrated circuits, and data transfer operations in such portions where wiring lines cannot be formed are carried out by employing wireless data transfer techniques by electromagnetic waves. In connection with the above-described conventional wireless communication technique, an attention is paid to the technical ideas which have been disclosed in Japanese magazine "NIKKEI MICRODEVICE" issued in Dec. 2003, page 161; JP-A-10-256478; JP-A-2000-124406; JP-A-2000-68904; and JP-A-2003-101320.

However, in order to conduct the conventional wireless technical ideas to data transfer operations within electronic appliances, mechanisms thereof are very complex and actual installations thereof can be hardly carried out, as compared with those of such a case that data have been transferred by way of conductor lines. In particular, in portable telephone terminals, power of transmitters of telephone functions (namely, principle object of portable telephone terminals) is extremely high, and thus, the transmission signals may give large disturbances to wireless connections established within the same electronic appliance (portable telephone terminal). As apparent from the foregoing explanations, as to the wireless communication executed in the same electronic appliance, only electromagnetic waves having low levels may be limitedly used which do not cause restriction subjects restricted by the Japanese electromagnetic wave control law, and the like. In fact, a difference between these signal levels is reached to 80 dB. Conversely, there are some possibilities that signals used to connect internal appliances may be mixed into telephone receivers as noise and may give disturbances thereto, for example, may lower sensitivities of these receivers. None of these conventional techniques discloses effective solving means with respect to the above-described problems.

Also, an antenna used to internally connect electronic appliances constitutes a very difficult problem when the above-described conventional wireless techniques are carried out. None of the above-described Japanese patent publications 5 to 8 describes any effective solving measure. For instance, the Japanese patent publication 6 describes that the antenna having the length equal to ¼ of the wavelength of the electromagnetic wave having the frequency of 1.5 GHz is formed on the integrated circuit. However, the wavelength of such an electromagnetic wave having the frequency of 1.5 GHz is equal to 20 cm, and thus, it is practically difficult to form such an antenna having a ¼-wavelegnth antenna length (namely, 5 cm) on the integrated circuit. Also, the Japanese patent publications 7 and 8 describe structures that insulating films are formed on semiconductor chips, and plane-shaped antenna radiators are positioned on the insulating films of the semiconductor chips. However, such a fact can be easily understood by ordinarily skilled engineers. That is, the electromagnetic waves cannot be effectively radiated from the antenna radiators positioned on the insulating films due to such thicknesses substantially equal to the thicknesses of the insulating films formed on the semiconductor chips.

Further, while communications are executed within electronic appliances in a point-blank range, propagations of electromagnetic waves must be considered based upon not only a far distance range where the normal communication line is applied, but also a specific propagation characteristic in the vicinity of the antenna.

To clarify this matter, a simulation executed based upon the conventional technique will now be explained with reference to drawings.

FIG. 11 is an illustration of a portable telephone terminal equipped with a clam shell structure, namely, a simulation of a portable telephone terminal which is arranged by both a display body unit 701 on which a display apparatus is mounted, and a main body unit 702 on which a baseband processor and an input apparatus (keyboard) are mounted. Although both the display body unit 701 and the main body unit 702 may be folded while a line X-X' is used as an axis, as indicated in this drawing, a simulation is carried out under such a condition that these units 701 and 702 are equipped with a clam shell structure, namely, a simulation of a portable telephone terminal which is arranged by both a display member unit 701 on which a display apparatus is mounted, and a main body unit 702 on which a baseband processor and an input apparatus (keyboard) are mounted. Although both the display body unit 701 and the main body unit 702 may be folded while a line X-X' is used as an axis, as indicated in this drawing, a simulation is carried out under such a condition that these units 701 and 702 are opened, namely under the normal condition.

In this portable telephone terminal model, in order that data to be displayed on the display apparatus is transmitted from the main body unit 702 to the display body unit 701 by employing electromagnetic waves, both a transmission-purpose antenna 703 and a reception-purpose antenna 704 are provided thereon respectively. Also, while a transmission/reception-purpose antenna 705 of a portable telephone is provided on the display body unit 701, electric power is fed from the main body unit 702 via a coaxial cable under the normal condition. In this drawing, any of these antennas were handled as mono-pole antennas for the sake of an easy simulation. In an actual embodiment mode, such low height antennas as an inverted-F type antenna must be selected as the antennas 703 and 704. However, it is conceivable that there is no such a large difference in simulation results of two antenna cases. Also, assuming now that the portable telephone-purpose antenna 705 transmits/receives electromagnetic waves in a frequency range of 2 GHz which is used in the third generation portable telephone system, and the internal appliance communication-purpose antennas 703 and 704 use electromagnetic waves in a frequency range of 5 GHz, such cylinders are employed as radiators, the lengths of which are 37.5 mm and 15 mm and correspond to a ¼ wavelength, and the diameters of which are 1 mm.

FIG. 12 represents a typical S parameter of an S matrix in the case that the internal appliance communication-purpose transmission antenna 703 is set as a port 1, the internal appliance communication-purpose reception antenna 704 is set as a port 2, and the telephone-purpose antenna 705 is set as a port 3.

In FIG. 12, a ratio of energy transferred from the internal appliance communication-purpose transmission antenna 703 to the reception antenna 704 is "$S_{21}$," whereas a ratio of energy transferred from the portable telephone antenna 705 to the internal appliance communication-purpose reception antenna 704 is "$S_{23}$." As understood from this drawing, the ratio "$S_{21}$" is approximately −16dB in the frequency of 5GHz used in the internal appliance communication, and the ratio "$S_{23}$" is −25 dB in the frequency of 2 GHz for the portable telephone.

In other words, a level difference between the transmission power of the internal appliance communication-purpose transmission antenna 703 and the transmission power of the portable telephone-purpose antenna 705 in the internal appliance communication-purpose reception antenna 704 is directly reflected to a DU ratio (Desire/Undesire ratio). Transmission power for a portable telephone is 23 dBm in maximum, and also, maximum transmission power which is permitted to a non-licensed radio station based upon Japanese electromagnetic wave control law corresponds to −64.3 dBm converted by EIRP. In accordance with the above-described simulation, both signals appear at the internal appliance communication-purpose antenna 704 as an extremely large level difference of approximately 80 dB (23−(−64.3)−(16−25)=78.3).

In an internal appliance communication-purpose reception unit, a filter means for removing this unwanted signal is required. However, in an actual case, it is practically difficult to mount a filter capable of removing such an extremely large level difference on this reception unit. Symbol "$S_{13}$" indicates a ratio of energy which is transmitted from the portable telephone-purpose antenna 705 to the internal appliance communication-purpose transmission antenna 703. since both the antennas correspond to transmission antennas, this energy ratio "$S_{13}$" does not cause a problem. However, for example, in a case that image data acquired by an imaging element mounted on the display body unit 701 is transmitted to the main body unit 702 in such a portable telephone terminal equipped with the above-described imaging element, for instance, in a portable telephone equipped with a camera, the internal appliance communication-purpose antenna 703 is used as a reception-purpose antenna, and thus, a value of this energy ratio "$S_{13}$" may be employed for a reference purpose. It should also be noted that since the S matrix corresponds to a symmetrical matrix, $S_{31}=S_{13}$. In this case, a condition becomes more severe, and thus, the DU ratio is reached to −90 dB.

As a consequence, the present invention has been made to solve the above-described various sorts of problems occurred when a large amount of data are transferred in high speeds and in the wireless manner between the respective circuit blocks employed in the conventional electronic appliances, and in particular, to solve the problems as to the disturbance eliminations and the sizes of the antennas in a case that the strong electromagnetic wave oscillating source is present which constitutes the principle purpose owned by the electronic appliance within the own electronic appliance, and therefore, has an object to provide both an electronic apparatus and a wireless communication terminal, which are capable of removing the drawbacks and the restrictions of the conventional data transfer system, and can be manufactured in low cost and with high reliability.

DISCLOSURE OF THE INVENTION

To solve the above-described problems, an electronic apparatus, according to the present invention, is featured by such an electronic apparatus equipped with at least a first transmission unit for performing a first communication by an electromagnetic wave; a second transmission unit for performing a second communication by an electromagnetic wave; and a reception unit for receiving a signal transmitted from the second transmission unit; in which the electronic apparatus is comprised of: an antenna in which a diameter of a sphere including a radiator is smaller than $1/(2\pi)$ of a wavelength of an electromagnetic wave used in either the second transmission unit or the reception unit.

In accordance with the above-described arrangement, the signal transmitted from the second transmission unit is received by the reception unit within the same electronic appliance. If these transmission and reception units are used so as to transfer a large amount of data in a high speed within the electronic appliance, since the data transfer operation is carried out by way of the electromagnetic waves while an air space is used as a medium, the various sorts of conventional problems caused by the high-speed and large-amount data transfer operation can be solved. In addition, since such antennas called as "small antennas" are employed as the antennas used in these transmission and reception units, the frequency bands thereof are narrow bands, and these small antennas represent strong frequency selective characteristics. As a result, the disturbances of the transmission signal transmitted from the first transmission unit can be reduced. Also, since the antennas are made compact, a so-called "proximity area" thereof is narrow. As a consequence, even when these compact antennas are arranged at narrow places such as spaces within the same appliance, signal lines can be designed in an easy manner.

Also, an electronic apparatus, according to the present invention, is featured by that the antenna is constituted by the radiator; and a reactance element for canceling a reactance component of the radiator.

In accordance with the above-described arrangement, since the reactance element capable of canceling the reactance component owned by the antenna is provided, the antenna can be manufactured in high performance, and the superior radiation efficiency can be obtained.

Also, an electronic apparatus, according to the present invention, is featured by that the first transmission unit, the second transmission unit, or either a partial circuit or all circuits of the reception unit are constructed on a semiconductor integrated circuit; and either a portion or all of reactance components of the radiator of the antenna are canceled by both a reactance component owned by a wiring line on the semiconductor integrated circuit, and a reactance component owned by a wiring line defined from the semiconductor integrated circuit up to the radiator of the antenna.

In accordance with the above-described arrangement, both the transmission unit and the reception unit used to transmit/receive the signals within the electronic appliance are simultaneously formed on the integrated circuit which constitutes the electronic appliance, so that the electronic appliance can be made compact and in low cost, and further, can be manufactured in high reliability. Also, since a portion of the reactance component owned by the antenna can be compensated by the stray element owned by such a wiring line defined from the semiconductor integrated circuit up to the antenna, the electronic apparatus can eliminate the adverse influence caused by the stray element such as the inductance of the bonding wire of the semiconductor integrated circuit, which constitutes the conventional problem.

Also, an electronic apparatus, according to the present invention, is featured by such an electronic apparatus equipped with at least a first transmission unit for performing a first communication by an electromagnetic wave; a second transmission unit for performing a second communication by an electromagnetic wave; and a reception unit for receiving a signal transmitted from the second transmission unit; in which the electronic apparatus is comprised of: an antenna in which a diameter of a sphere including a radiator is smaller than $1/(2\pi)$ of a wavelength of an electromagnetic wave used in either the second transmission unit or said reception unit; evaluation means for evaluating a reception condition of the reception unit; control means for controlling a frequency of an electromagnetic wave transmitted by the second transmission unit; and feedback means for feeding back an evaluation result made by the evaluation means to the control means.

In accordance with the above-explained arrangement of the present invention, the signal transmitted from the second transmission unit is received by the reception unit within the same electronic appliance. If these transmission and reception units are used so as to transfer a large amount of data in a high speed within the electronic appliance, since the data transfer operation is carried out by way of the electromagnetic waves while an air space is used as a medium, the various sorts of conventional problems caused by the high-speed and large-amount data transfer operation can be solved. In addition, since such antennas called as "small antennas" are employed as the antennas used in these transmission and reception units, the frequency bands thereof are narrow bands, and these small antennas represent strong frequency selective characteristics. As a result, the disturbances of the transmission signal transmitted from the first transmission unit can be reduced. Also, since the antennas are made compact, a so-called "proximity area" thereof is narrow. As a consequence, even when these compact antennas are arranged at narrow places such as spaces within the same appliance, signal lines can be designed in an easy manner. Since such a compact type antenna owns the strong frequency selective characteristic, this compact type antenna has a high sensitivity with respect to a fluctuation of circuit manufacturing operations and a variation of peripheral conditions. However, since the electronic apparatus of the present invention is equipped with the feedback means and can be controlled to be continuously operated at an optimum frequency, the unstable elements caused by this factor can be removed.

Also, an electronic apparatus, according to the present invention, is featured by that a shape of the radiator of the antenna is a line shape.

In accordance with the above-described arrangement of the present invention, while the antenna can be designed in an easy manner, the frequency characteristic of the antenna can be made in the narrow frequency band, and thus, can own the strong frequency selective characteristic.

Also, an electronic apparatus, according to the present invention, is featured by that the radiator of the antenna is constituted by a print pattern formed on a printed circuit board.

In accordance with the above-described arrangement of the present invention, the antenna can be formed on the integrated circuit in combination with the wiring pattern, and the mounting step of the antenna can be simplified. In addition, a communication appliance can be made compact and in low cost, while reliability of this communication appliance can be improved.

Also, a wireless communication terminal, according to the present invention, is featured by such a wireless communication terminal comprising: a first housing unit; a second housing unit; a coupling unit for coupling the first housing unit to the second housing unit in such a manner that a positional relationship between the first housing unit and the second housing unit is changeable; an external wireless communication-purpose antenna which is mounted on either the first housing unit or the second housing unit; an external wireless communication control unit mounted on the first housing unit, for mainly controlling an external wireless communication performed via the external wireless communication-purpose antenna; a display unit mounted on the second housing unit; a first internal wireless communication control unit mounted on the first housing unit, for controlling an internal wireless communication executed between the first housing unit and the second housing unit; a second internal wireless communication control unit mounted on the second housing unit, for controlling an internal wireless communication executed between the first housing unit and the second housing unit; a first internal wireless communication-purpose antenna mounted on the first housing unit, in which a diameter of a sphere including a radiator is smaller than $1/(2\pi)$ of a wavelength of an electromagnetic wave used in the internal wireless communication; a second internal wireless communication-purpose antenna mounted on the second housing unit, in which the diameter of the sphere including the radiator is smaller than $1/(2\pi)$ of the wavelength of the electromagnetic wave used in the internal wireless communication; and an internal wireless timing control unit for controlling transmission timing of the electromagnetic wave transmitted in the internal wireless communication based upon transmission timing of the electromagnetic wave transmitted via the external wireless communication-purpose antenna.

In accordance with the above-explained arrangement of the present invention, the frequency range of the internal wireless communication-purpose antenna can be made narrow, and the frequency selective characteristic can be improved, and further, the directivity thereof can be relaxed. As a consequence, the interference between the external wireless communication and the internal wireless communication can be reduced and the disturbance can be lowered. Even in a case that a clam shell structure is employed in a portable telephone, data transfer operation between the housings of the portable telephone can be carried out in a wireless mode under stable condition. As a result, even in the case that an amount of data transmitted/received between the housings is increased in correspondence with high resolution of the display unit mounted on the portable telephone, while a complex structure of a coupling unit can be suppressed, the cumbersome mounting steps can be avoided. As a result, the portable telephone can be made compact and slim in higher reliability, while the cost-up aspect is suppressed; and further, while the portability of the portable telephone is not deteriorated, the portable telephone can be manufactured with a large display screen and can be equipped with multiple functions.

BEST MODE FOR CARRYING OUT THE INVENTION

Referring now to drawings, embodiment modes of the present invention will be described.

Figure 1:
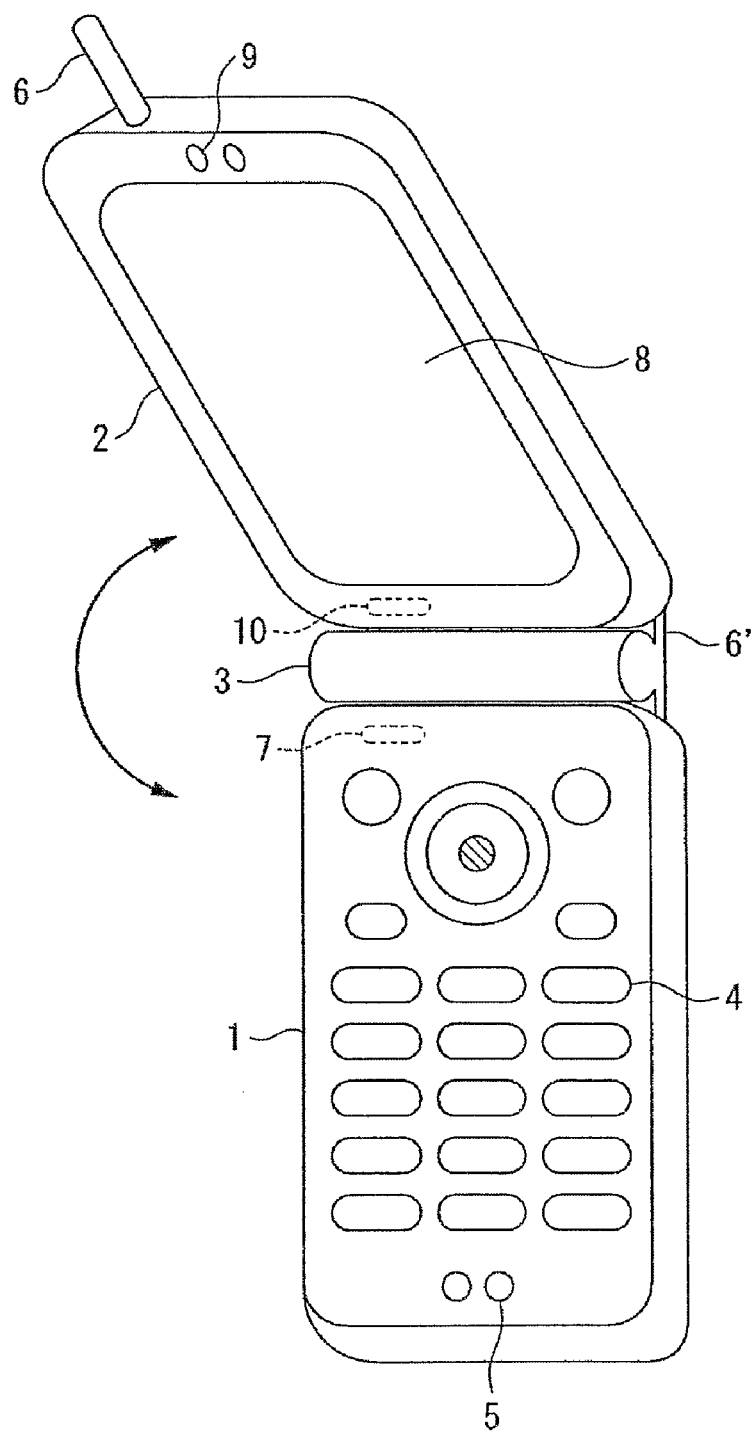
FIG. 1 is a perspective view for representing a condition that a clam shell type portable telephone of the present invention is opened on which an antenna is mounted.
Figure 2:
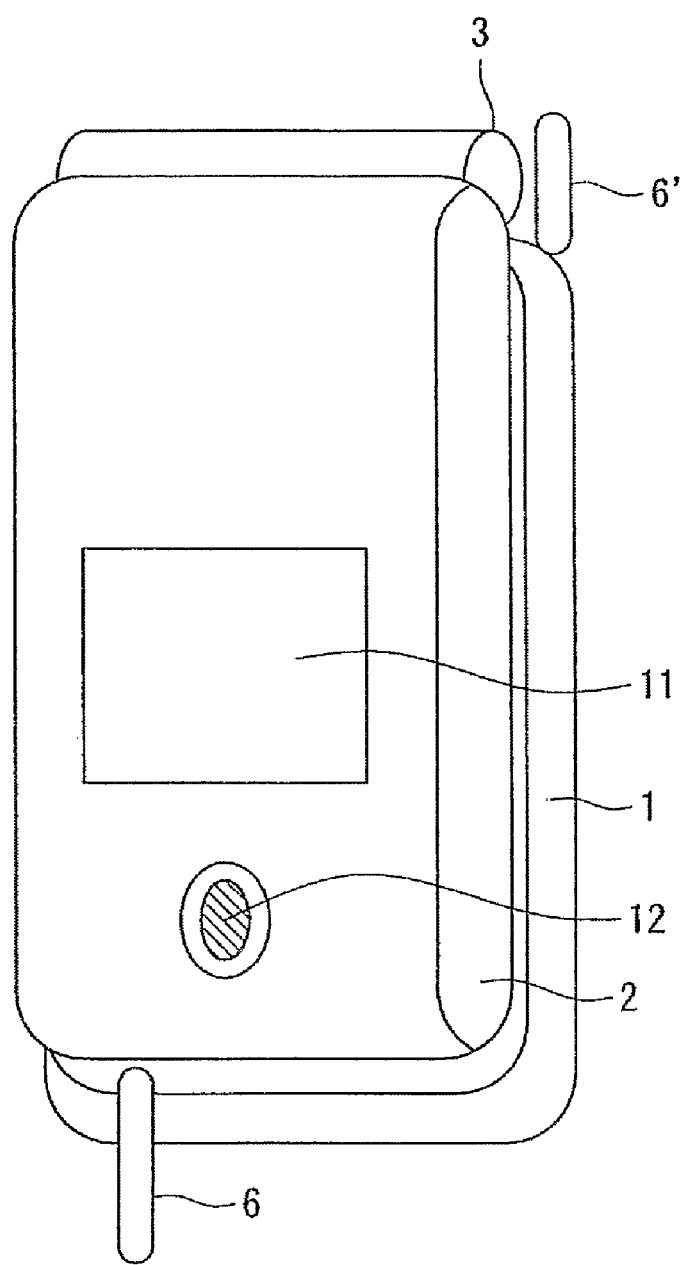
FIG. 2 is a perspective view for representing a condition that the clam shell type portable telephone of the present invention is closed on which the antenna is mounted.

FIG. 1 is a perspective view for representing a condition that a clam shell type portable telephone of the present invention is opened on which an antenna is mounted. FIG. 2 is a perspective view for representing a condition that the clam shell type portable telephone of the present invention is closed on which the antenna is mounted.

In FIG. 1 and FIG. 2, an operation button 4 has been arranged on a surface of a first housing unit 1, and also, a microphone 5 has been provided on a lower edge of the first housing unit 1. Also, a display member 8 has been provided on a surface of a second housing unit 2, a speaker 9 has been provided on an upper edge of the second housing unit 2, and an external wireless communication-purpose antenna 6 has been mounted on an upper edge of the second housing unit 2. In this case, signals which are transmitted/received by the external wireless communication antenna 6 can be communicated via a coaxial cable with the first housing unit 1. Also, the external wireless communication-purpose antenna 6 may be alternatively mounted on the first housing unit 1 as indicated by reference numeral 6.

Also, both a display member 11 and an imaging element 12 have been provided on an outer plane of the second housing unit 2. It should also be noted that as the display members 8 and 11, for example, a liquid crystal display panel, an organic EL panel, or a plasma display panel may be employed. Also, as the imaging element 12, either a CCD or a CMOS sensor maybe employed. Also, internal wireless communication-purpose antennas 7 and 10 which perform an internal wireless communication between the first housing unit 1 and the second housing unit 2 have been provided in both the first housing unit 1 and the second housing unit 2, respectively.

Then, the first housing unit 1 is coupled via a hinge 3 to the second housing unit 2. Since the second housing unit 2 is rotated by setting the hinge 3 as a fulcrum, the second housing unit 2 can be folded on the first housing unit 1. Then, since the second housing unit 2 is closed on the first housing unit 1, the operation button 4 can be protected by way of the second housing unit 2, and it is possible to avoid that the operation button 4 is mistakenly operated when the portable telephone is carried. Also, since the second housing unit 2 is opened from the first housing unit 1, the operation button 4 can be operated while the display member 8 is viewed; a telephone communication can be carried out while the speaker 9 and the microphone 5 are used; and also, an imaging operation can be carried out while the operation button 4 is operated.

In this case, since the clam shell structure is employed, the display member 8 can be arranged over a substantially entire area of the second housing unit 2, and the size of the display member 8 can be enlarged without deteriorating the portability of the portable telephone, so that the visible characteristic can be improved.

Also, since the internal wireless communication-purpose antennas 7 and 10 are provided in the first housing unit 1 and the second housing unit 2 respectively, data transmission operations can be carried out between the first housing unit 1 and the second housing unit 2 by way of internal communications by using the internal wireless communication-purpose antennas 7 and 10. For example, both image data and voice data which have been acquired into the first housing unit 1 via the external wireless communication-purpose antenna 6 are transmitted to the second housing unit 2 by way of the internal wireless communication by using the internal wireless communication-purpose antennas 7 and 10, so that an image may be displayed on the display member 8 and voice may be outputted from the speaker 9. Also, imaging data acquired by the imaging element 12 is transmitted from the second housing unit 2 to the first housing unit 1 by way of the internal wireless communication by employing the internal wireless communication-purpose antennas 7 and 10, and then, may be sent out to an external unit via the external wireless communication-purpose antenna 6.

As a result, there is no need for transmitting the data between the first housing unit 1 and the second housing unit 2 by way of a wire manner, but also, a flexible wiring board equipped with multiple pins is no longer penetrated through the hinge 3. Accordingly, the complex structure of the hinge 3 can be suppressed; the cumbersome mounting steps can be avoided, the portable telephone can be made compact and slim in higher reliability, while the cost-up aspect is suppressed; and further, while the portability of the portable telephone is not deteriorated, the portable telephone can be manufactured with a large display screen and can be equipped with multiple functions.

Figure 3:
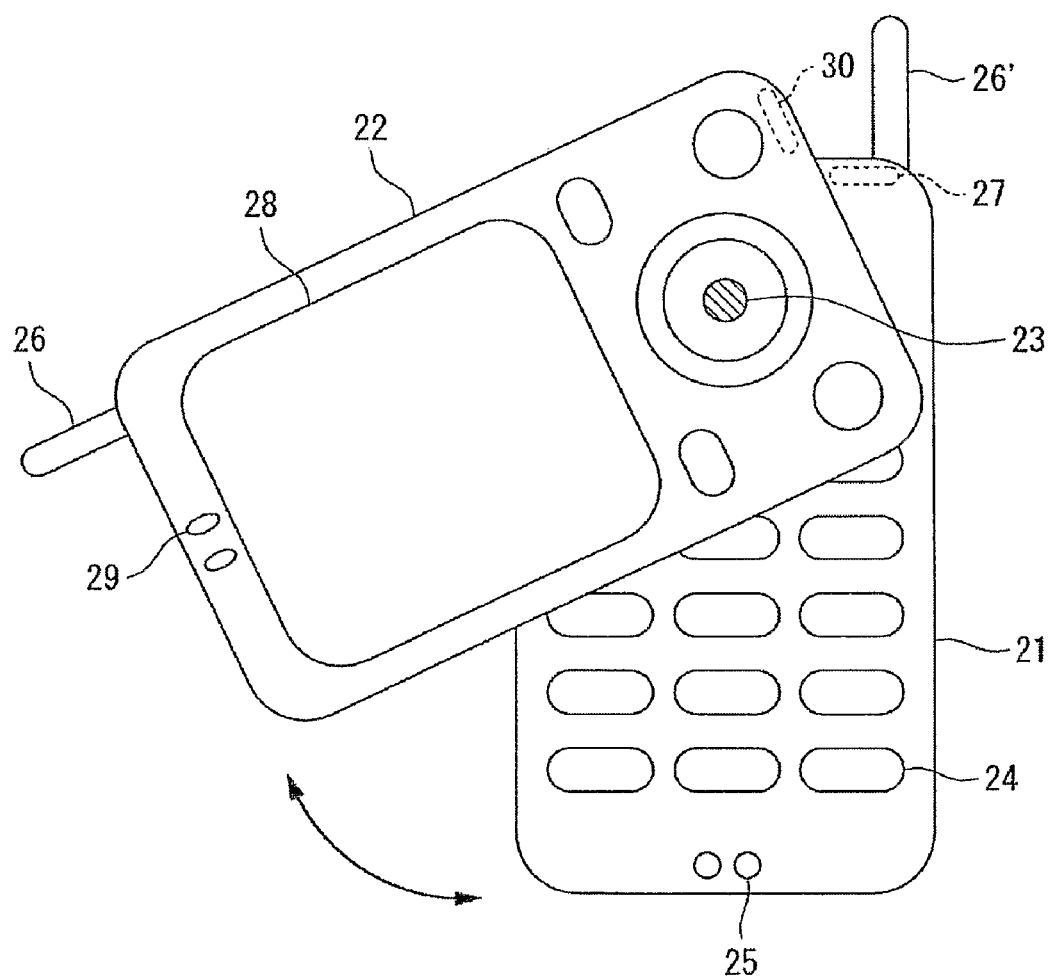
FIG. 3 is a perspective view for showing an outer appearance of a rotary type portable telephone of the present invention, on which an antenna is mounted.

FIG. 3 is a perspective view for showing an outer appearance of a rotary type portable telephone of the present invention, on which an antenna is mounted.

In FIG. 3, an operation button 24 has been arranged on a surface of a first housing unit 21, and also, a microphone 25 has been provided on a lower edge of the first housing unit 21. Also, a display member 28 has been provided on a surface of a second housing unit 22, a speaker 29 has been provided on an upper edge of the second housing unit 22, and an external wireless communication-purpose antenna 26 has been mounted on an upper edge of the second housing unit 22. In this case, signals which are transmitted/received by the external wireless communication antenna 26 can be communicated via a coaxial cable with the first housing unit 21. Also, the external wireless communication-purpose antenna 26 may be alternatively mounted on the first housing unit 21 as indicated by reference numeral 26'.

Also, internal wireless communication-purpose antennas 27 and 30 which perform an internal wireless communication between the first housing unit 21 and the second housing unit 22 have been provided in both the first housing unit 21 and the second housing unit 2, respectively.

Then, the first housing unit 21 is coupled via a hinge 23 to the second housing unit 22. Since the second housing unit 22 is horizontally rotated by setting the hinge 23 as a fulcrum, the second housing unit 22 can be folded on the first housing unit 21. Also, the second housing unit 22 can be shifted from the first housing unit 21. Then, since the second housing unit 22 is arranged in such a manner that this second housing unit 22 is overlapped on the first housing unit 21, the operation button 24 can be protected by way of the second housing unit 22, and it is possible to avoid that the operation button 24 is mistakenly operated when the portable telephone is carried. Also, since the second housing unit 22 is horizontally rotated so as to be shifted from the first housing unit 21, the operation button 24 can be operated while the display member 28 is viewed; and a telephone communication can be carried out while the speaker 29 and the microphone 25 are used.

In this case, since the internal wireless communication-purpose antennas 27 and 30 are provided in the first housing unit 21 and the second housing unit 22 respectively, data transmission operations can be carried out between the first housing unit 21 and the second housing unit 22 by way of internal communications by using the internal wireless communication-purpose antennas 27 and 30. For example, both image data and voice data which have been acquired into the first housing unit 21 via the external wireless communication-purpose antenna 26 (or 26') are transmitted to the second housing unit 22 by way of the internal wireless communication by using the internal wireless communication-purpose antennas 27 and 30, so that an image may be displayed on the display member 28 and voice may be outputted from the speaker 29.

As a result, a flexible wiringboard equipped with multiple pins is no longer penetrated through the hinge 23. Accordingly, the complex structure of the hinge 23 can be suppressed; the cumbersome mounting steps can be avoided, the portable telephone can be made compact and slim in higher reliability, while the cost-up aspect is suppressed; and further, while the portability of the portable telephone is not deteriorated, the portable telephone can be manufactured with a large display screen and can be equipped with multiple functions.

It should also be understood that although the portable telephones have been exemplified in the above-described embodiment mode, the present invention may be alternatively applied to video cameras, PDAs (Personal Digital Assistants), notebook type personal computers, and the like.

Embodiment 1

Figure 4A:
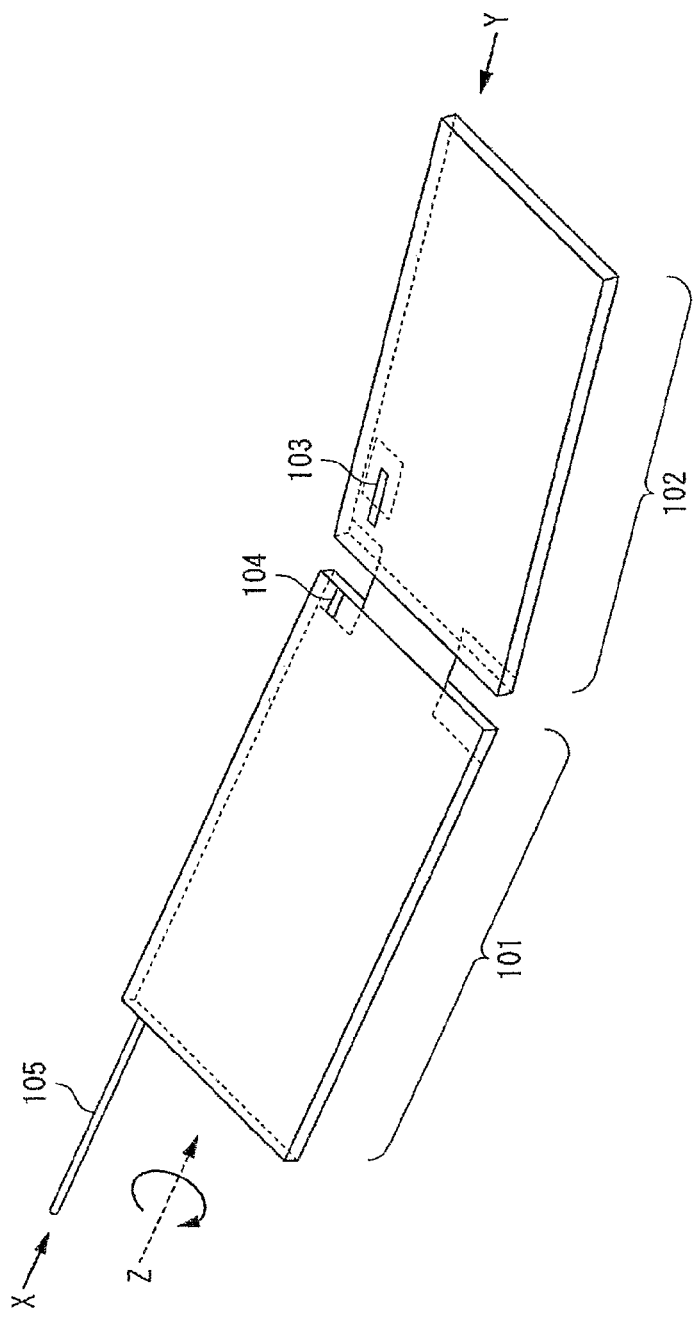
FIG. 4 is a diagram for explaining an embodiment of the present invention.
Figure 4B:
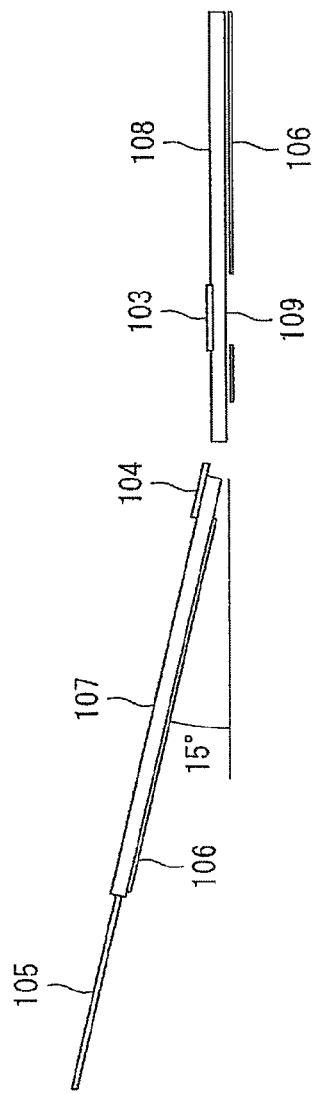

FIG. 4(A) is a perspective diagram for showing an embodiment according to the present invention, and FIG. 4(B) is a sectional view of the embodiment of FIG. 4(A), cut away on a plane which involves a straight line indicated by an arrow "X-Y" in FIG. 4(A).

In FIG. 4, reference numeral 101 shows a display body unit on which a liquid crystal display member and an imaging element are mounted, and the display member is mounted on a dielectric board 107 in combination with a display member drive circuit, and the like. Reference numeral 102 shows a main body unit; and an input apparatus such as a keyboard, a CPU of the main body unit 102, a modulating/demodulating circuit required in a telephone function process operation, and the like are mounted on a dielectric board 108. Display data produced in the main body unit 102 is processed by a modulating circuit and the like mounted on the main body unit 102, and thereafter, the processed display data is radiated as electromagnetic waves from an internal appliance communication-purpose transmission antenna 103, and then, the transmitted display data is received by an internal appliance communication-purpose reception antenna 104. The received signal is processed by a reception circuit provided on the display body unit 101 based upon demodulating process operation, and then, is converted into display data, so that the content of the display data is displayed on the display member provided on the display body unit 101. Reference numeral 105 shows an antenna used for a portable telephone. Electric power is supplied to the antenna 105 via a coaxial cable by the main body unit 102.

Figure 11:
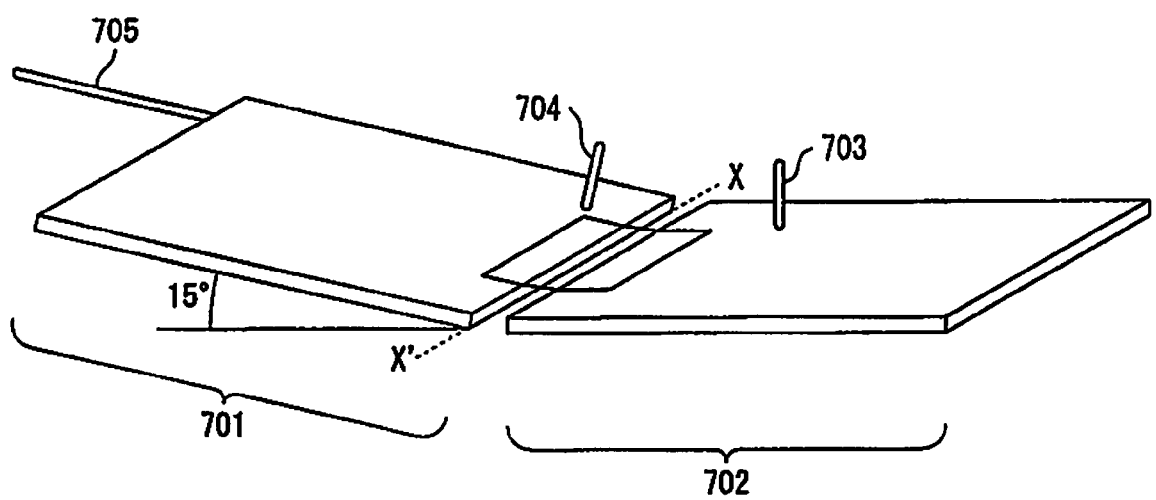
FIG. 11 is a diagram for describing the conventional technique.
Figure 12:
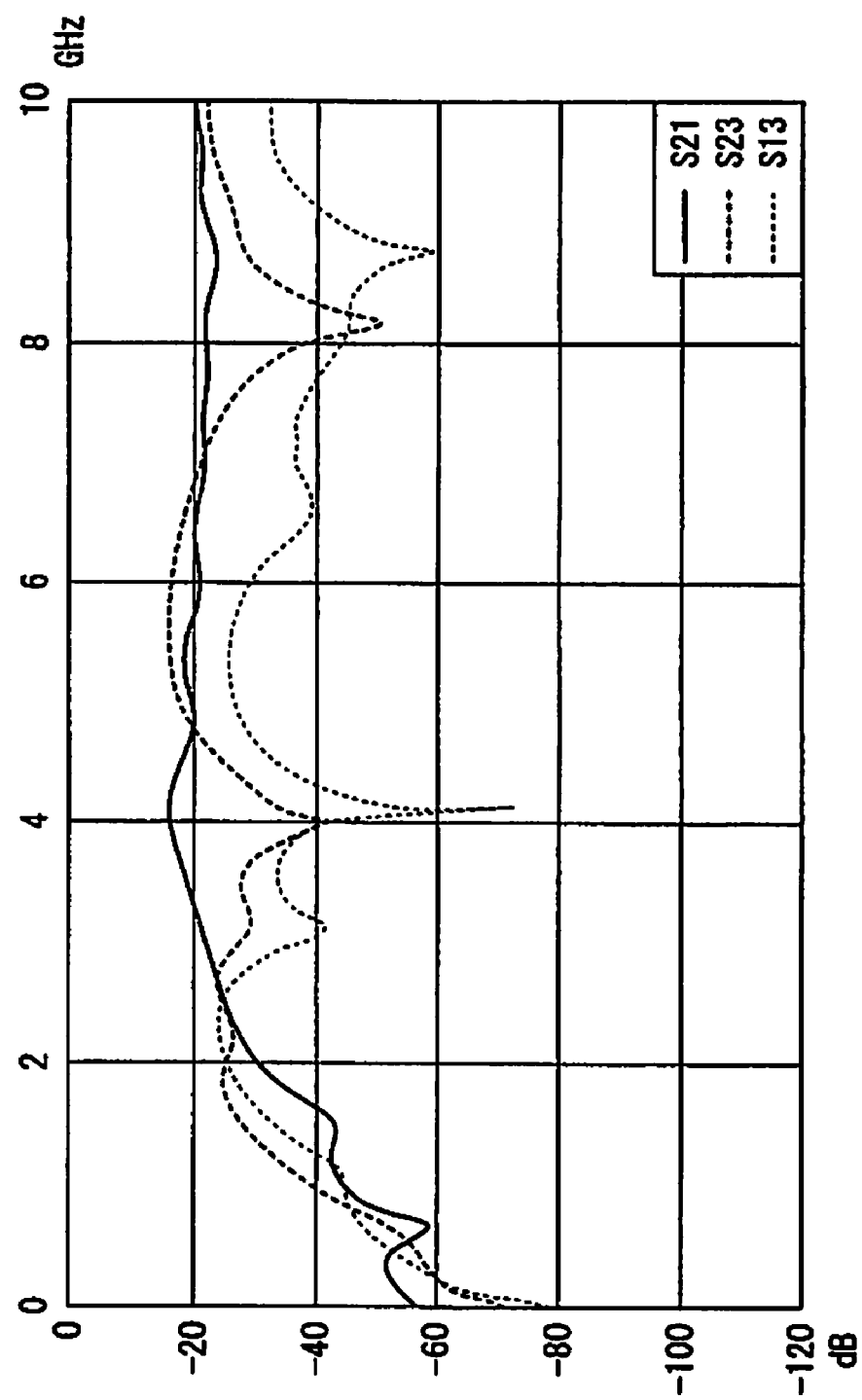
FIG. 12 is a diagram for describing the conventional technique.

A positional relationship of the antenna of FIG. 4 and a used frequency thereof are identical to those of the prior art shown in FIG. 11. Also, rear planes of the dielectric boards 107 and 108 of both the display body unit 101 and the main body unit 102 have been covered by a conductor 106 as a ground plane. In FIG. 4(B), the same reference numerals 106 are indicated at two positions. This is because the same reference numerals 106 represent the same components which are maintained at the equi-potential via the hinge portion. Also, although the ground plane covers the substantially entire plane of the rear planes of the dielectric boards, this illustration is made in order to easily perform a simulation. In an actual case, this ground plane is used as the ground of a circuit to be mounted, and thus, this ground plane becomes a complex pattern.

Figure 5:
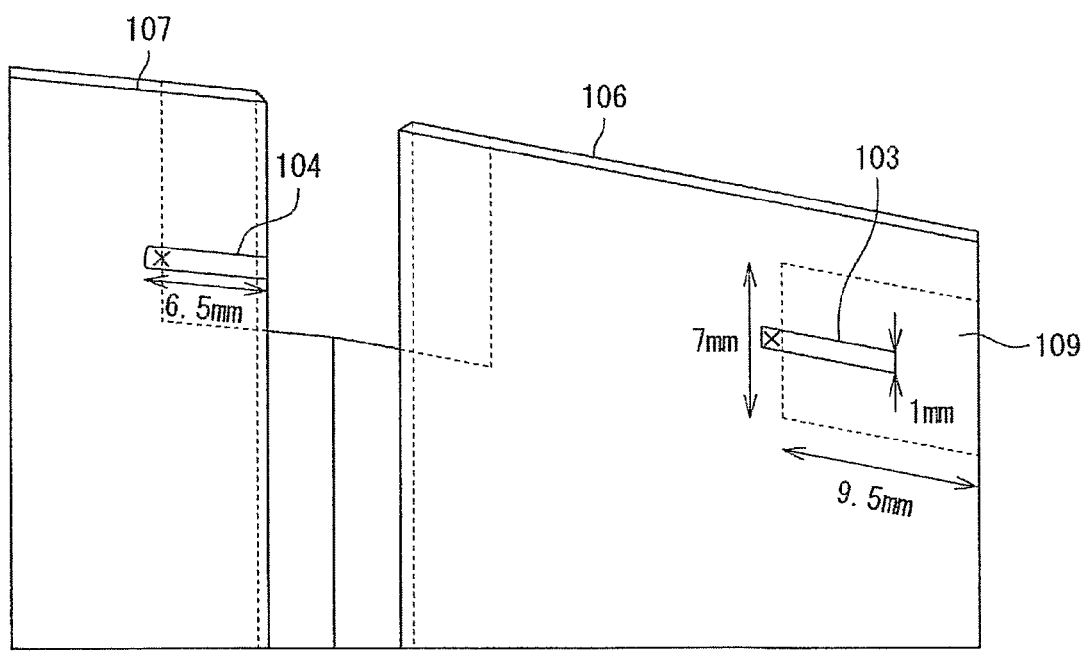
FIG. 5 is a diagram for explaining an antenna portion in detail in the embodiment of the present invention.

FIG. 5 is a diagram for explaining the internal appliance communication-purpose transmission/reception antennas 103 and 104 in more detail, related to the present invention. It should be understood that the same reference numerals shown in FIG. 4 are employed as those for denoting the same structural elements of FIG. 5. In this embodiment, as to both the transmission/reception antennas 103 and 104, a rectangular-shaped conductor having a length of 6.5 mm and a width of 1 mm is employed as an antenna radiator. This rectangular-shaped conductor may be constituted in the form of a conductor pattern of a printed circuit board, functioning as a portion of a circuit board, and owns a merit in manufacturing process, since such a specific construction and a specific element as an inverted-F type antenna are not required. A size of this antenna is nearly equal to $1/10$ of the wavelength (6 cm) of the use frequency (5 GHz), and is shorter than, or equal to $1/(2\pi)$ of the wavelength, and thus, is called as a "small antenna". It should also be noted that symbol "$\pi$" is a ratio of the circumference of a circle to its diameter.

In order to increase radiation efficiencies of both the antennas, the rear surfaces of the radiators are escaped from the ground plane. As to the internal appliance communication-purpose transmission antenna 103, a rectangular hole 109 having a dimension of 7×9.5 mm has been pierced in the rear surface ground plane. Also, the internal appliance communication-purpose antenna 104 is constituted on an edge plane of the board, and a notch portion has been formed on the ground plane. It should also be noted that these antennas and components are merely exemplified as one example, and therefore, may be freely changed for the sake of easy component arrangements. While points indicated by symbols "X" in FIG. 5 are employed as feeding points, electric power is fed between the internal appliance communication transmission/reception antennas 103 and 104 and points on the ground planes located just under these antennas 103 and 104.

Figure 6:
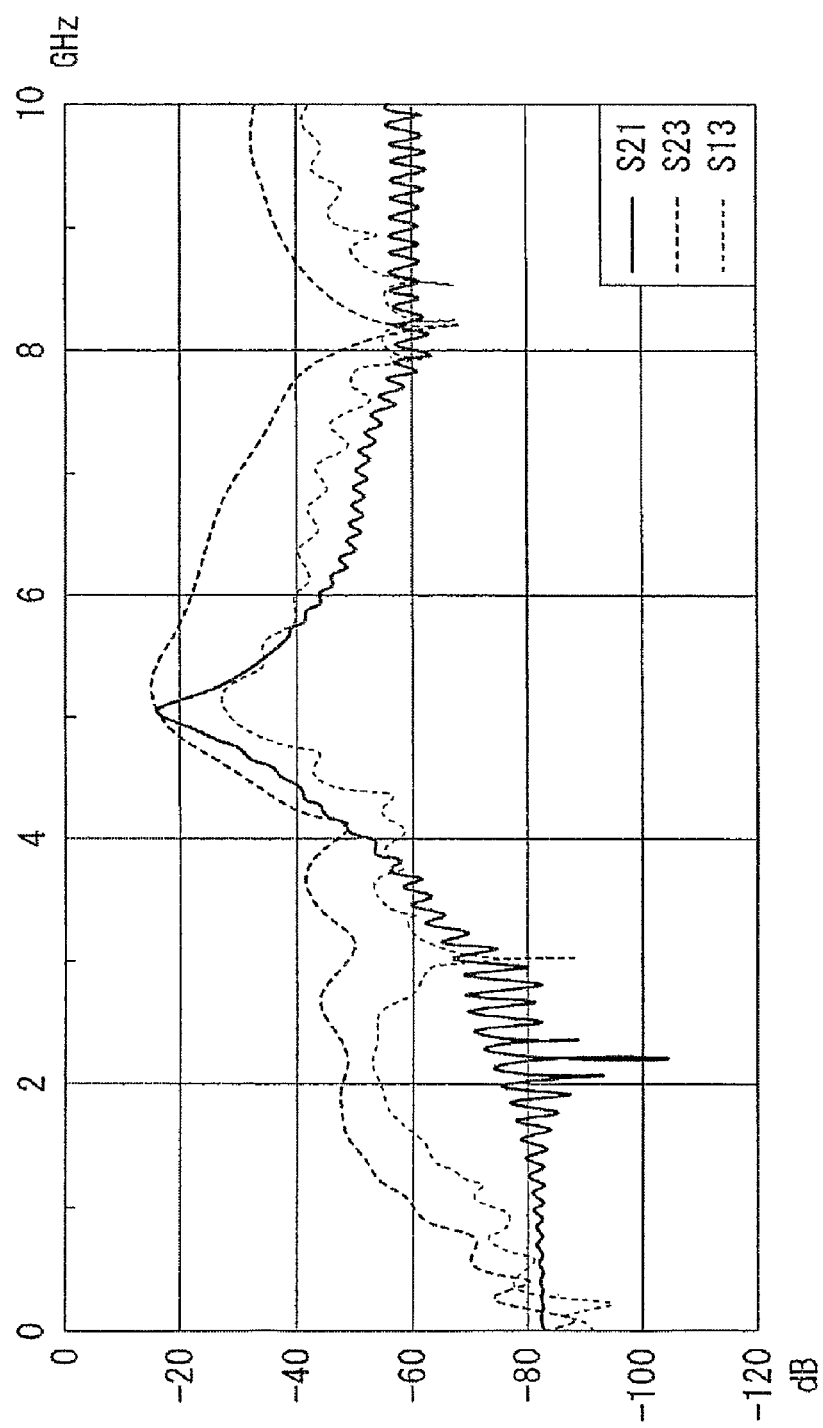
FIG. 6 is a diagram for describing an effect of the antenna portion in the embodiment of the present invention.

FIG. 6 indicates calculation results by executing a simulation of an S parameter when the internal appliance communication-purpose transmission antenna 103 is used as a port 1, the internal appliance communication-purpose reception antenna 104 is used as a port 2, and the portable telephone-purpose antenna is used as a port 3. As apparent from this calculation result of FIG. 6, a ratio "$S_{21}$" of energy transferred from the internal appliance communication-purpose transmission antenna 103 to the reception antenna 104 is −16 dB in the use frequency 5 GHz, whereas a ratio "$S_{23}$" of energy transferred from the portable telephone antenna 105 to the internal appliance communication-purpose reception antenna 104 is −49 dB in the use frequency 2 GHz. In other words, a difference between the energy ratios $S_{21}$ and $S_{23}$ is reflected to the level difference between the transmission power of the internal appliance communication-purpose transmission antenna 103 and the transmission power of the portable telephone-purpose antenna 105 in the internal appliance communication-purpose reception antenna 104, and a DU ratio may be improved by 33 dB. In order to perform an internal appliance communication without any problem, the DU ratio must be further improved by 47 dB. However, such an interference may be sufficiently prevented by a diffusion gain and the like obtained by a filter and a communication system. This may cause a system design to become easy, and also, may cause system performance to be considerably improved.

Generally speaking, an antenna having a size that this antenna can be stored into a sphere whose diameter is equal to $1/(2\pi)$ of a wavelength is referred to as a "small antenna." Within a distance measured from a radiation source of electromagnetic waves, which is shorter than, or equal to $1/(2\pi)$ of a wavelength, an electrostatic field and an inductive field are superior to a radiative field, and are referred to as a reactive radiation area. One terminal of a small antenna is contained in the reactive radiation area, as viewed from the other terminal of this small antenna. Also, a phase difference from a center of an antenna up to a terminal thereof becomes smaller than, or equal to 0.5 radian, and this is an area that a difference between a circular measure "x" and sin x becomes smaller than, or equal to 2%, and also corresponds to an area that sin x can be approximated by "x." In a system using such a small antenna, there is substantially no a radiation proximity area which is called as a Fresnel area, and a communication line can be easily designed. When the antenna becomes such a small antenna, a radiation impedance becomes reactive, and a real part of a radiation impedance is lowered. This implies that "Q" of the radiation impedance is increased and a band is narrowed. Also, radiation directivity becomes gentle, and a gain along the maximum radiation direction is approximated to 1.5.

Figure 7:
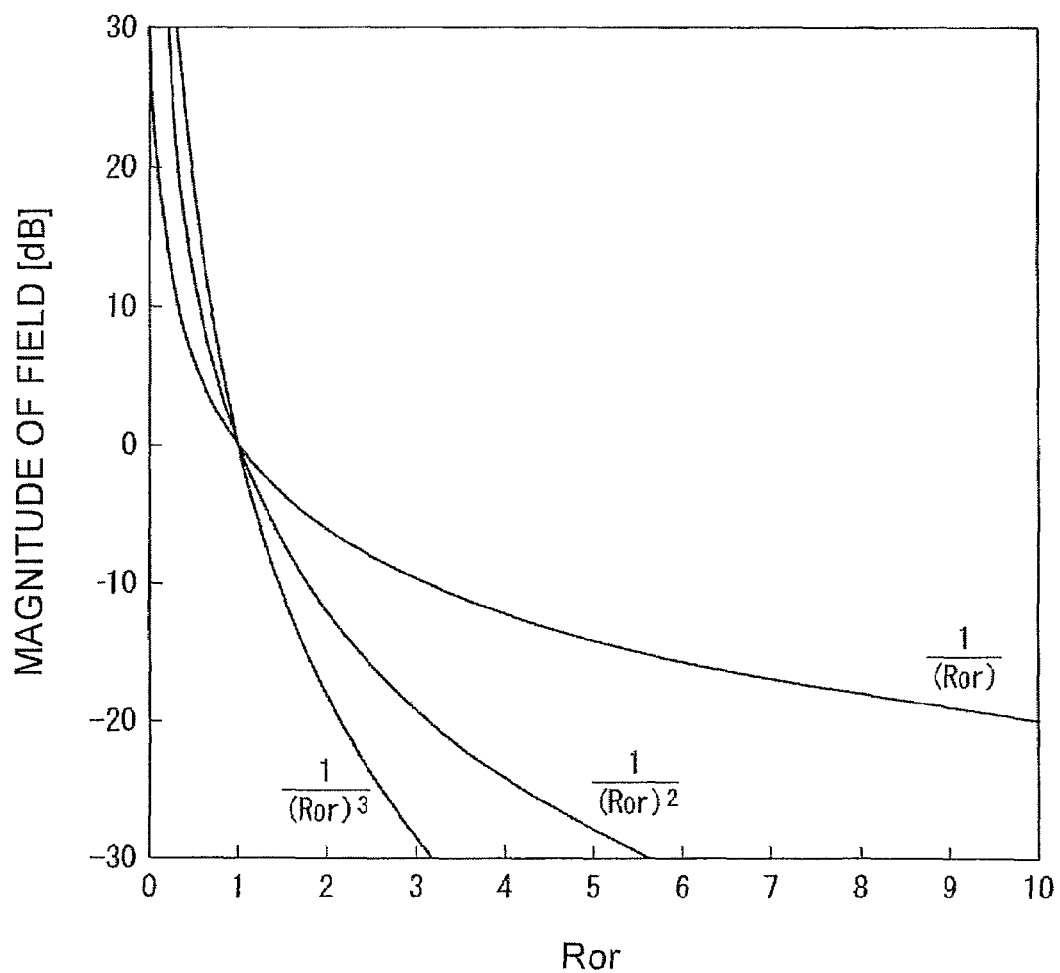
FIG. 7 is a diagram for indicating a field radiated from a very small current element.

FIG. 7 is a diagram for indicating a field which is radiated from a very small current element.

In FIG. 7, a radiation electromagnetic field radiated from a very small current element is conceived as a summation of three components which are directly proportional to $1/r$, $1/r^2$, and $1/r^3$ with respect to a distance "r" from a wave source, which are called as a radiative field, an inductive field, and an electrostatic field. When the distance "r" becomes 1/K (symbol "K" indicates $2\pi/\lambda$), "Kr" becomes equal to 1, and thus, dimensions of the respective fields are made coincident with each other. When the distance "r" is smaller than 1/K, the strengths of both the inductive field and the electrostatic field become dominant, as compared with the radiative field. This area corresponds to a reactive radiation area.

In such a case that a radiator of an antenna is completely included by the reactive radiation area, namely, in the case that a diameter of a sphere which includes the radiator is smaller than 1/K, i.e., smaller than $1/(2\pi)$, a reactance component of this antenna becomes dominant, so that both a frequency range of this antenna and an antenna efficiency thereof are largely influenced. This phenomenon has been described in detail in, for instance, the below-mentioned publication:

Chu, L. I. "Physical Limitations of omni-directional Antennas", Journal of Applied Physics, 1948, 19, pp. 1163-1175.

McLean, J. S. "A Re-examinations of the Fundamental Limits on the Radiation Q of Electrically Small Antennas" IEEE trans. Antennas Propagation Vol 44, pp 672-676. 1996.

The embodiments of the present invention utilize this characteristic of the small antenna, and can effectively utilize a reactance component owned by the antenna by setting a size of the antenna in such a manner that the diameter of the sphere including the radiator of the antenna becomes smaller than $1/(2\pi)$ of a wavelength of a use electromagnetic wave, and also can eliminate interference by sharpening a frequency selecting characteristic owned the antenna itself. Also, in the small antenna, since directivity of this small antenna is relaxed, even in such a positional relationship between a transmission side and a reception side in a complex housing structure having a so-called "two-axial construction", the $S_{21}$ characteristic becomes flat and stable operations can be realized. As to this complex housing structure, in a portable telephone having a clam shell structure, housings may be rotated, while the straight line indicated by "Z" of FIG. 4(A) is employed as an axis.

In this embodiment 1, a simulation is carried out based upon such a size that a diameter can be stored in a sphere of $1/(3\pi)$ of a wavelength, and then, this embodiment 1 represents that a superior characteristic can be obtained. Furthermore, such a size may be alternatively employed in which a diameter may be stored in a sphere of $1/5\pi$, of a wavelength. In this alternative case, it is suitable to arrange an antenna on a chip, or within a package, or on the package. It is preferable that a lower limitation as to a size of an antenna is selected to be larger than, or equal to a line width of a wiring line.

Figure 8:
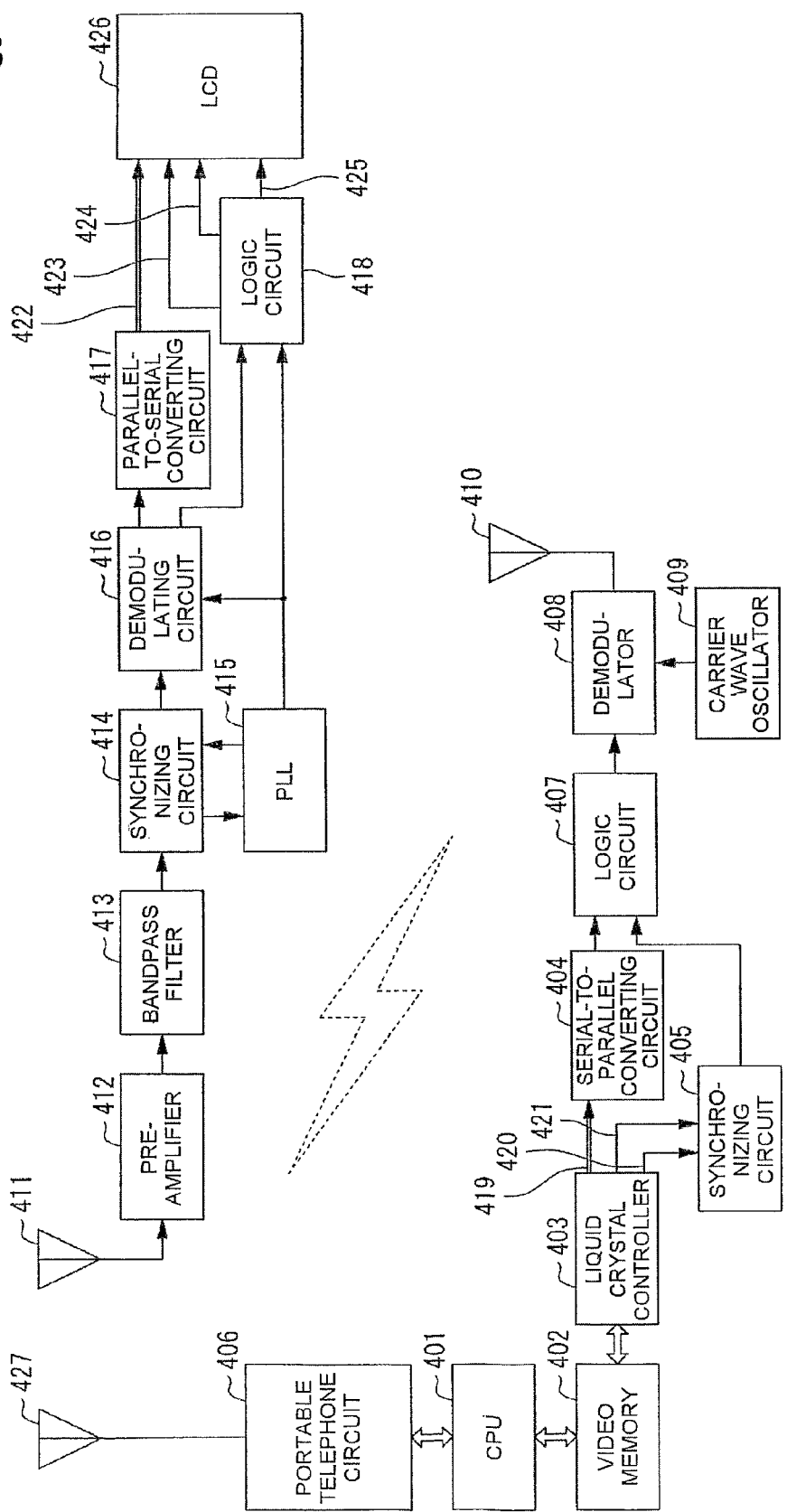
FIG. 8 is a block diagram for describing an embodiment of the present invention.

FIG. 8 is a block diagram for indicating a major portion of an electronic circuit of an apparatus according to an embodiment of the present invention.

In FIG. 8, a CPU 401 produces display data which should be displayed based upon information acquired from a portable telephone circuit 406 and a calculation, and then records the display data in a video memory 402. A liquid crystal controller 403 reads display data 419 which is displayed on the display member from the video memory 402 in a predetermined sequence, and then, outputs the read display data 419 in combination with a vertical synchronization signal 421, and a horizontal synchronization signal 420. The display data 419 is parallel-to-serial-converted by a parallel/serial converting circuit 404, and then, transmits the parallel/serial-converted display data 419 to a logic circuit 407. A synchronizing circuit 405 produces a preamble by receiving the horizontal synchronization signal 420 and the vertical synchronization signal 421. This preamble is employed so as to establish a synchronization which is required for communication, for example, timing for a synchronous detection. The logic circuit 407 receives the signal derived from the parallel/serial converting circuit 404 and the signal derived from the synchronizing circuit 405 SO as to produce a packet (data) used in a wireless communication, and this packet data is modulated by a modulator 408 based upon a carrier frequency produced by a carrier wave oscillator 409, and then, the modulated packet data is transmitted by a transmission antenna 410. This transmission antenna 410 corresponds to the internal appliance communication-purpose transmission antenna 103 shown in FIG. 4. The above-described circuit elements are mounted on the display body unit 101 of FIG. 4. A portable telephone-purpose antenna 427 is mounted on the display member unit (101 shown in FIG. 1), and is connected to the portable telephone circuit 406 provided in the main body unit 102 by using a coaxial cable.

A reception antenna 411 receives the electromagnetic wave signal transmitted from the transmission antenna 410. The reception antenna 411 corresponds to the internal appliance communication-purpose reception antenna 104 shown in FIG. 4. After this signal has been amplified by a preamplifier 412, interference waves in an unnecessary frequency band are eliminated from this amplified signal by a bandpass filter 413, and then, the filtered signal is entered to another synchronizing circuit 414. The bandpass filter 413 may be replaced by such a notch filter capable of blocking a specific frequency band, for instance, a telephone-purpose transmitter frequency band. Alternatively, the bandpass filter 413 may be provided at a prestage of the preamplifier 412. In the case that the bandpass filter 413 is provided at the prestage of the preamplifier 412, since the interference waves are removed before the signal is inputted to the preamplifier 412, a margin may be produced in the dynamic range of the preamplifier 412. To the contrary, if the bandpass filter 413 owns a loss, then the noise figure of the preamplifier 412 is deteriorated.

Even in anyone of these cases, since the frequency selecting characteristic is realized by the transmission antenna 410 and the reception antenna 411, a margin may be produced in a design, so that a system structure may be easily made. The synchronizing circuit 414 detects the preamble contained in the reception signal packet, and produces both synchronization timing and a clock which are required for a demodulating operation in conjunction with a PLL 415. In response to a reception signal, a demodulating circuit 416 demodulates the reception signal packet by using the outputs of the synchronizing circuit 414 and the PLL 415. Another logic circuit 418 produces a horizontal synchronization signal 423, a vertical synchronization signal 424, and a transfer clock 425 of an X driver from the demodulated packet by being fitted to the timing with respect to display data 422 contained in the packet. Then, the logic circuit 418 outputs the horizontal synchronization signal 423, the vertical synchronization signal 424, and the transfer clock 425 to a liquid crystal driver employed in a liquid crystal display member LCD 426 respectively so as to perform a display operation. The above-explained circuit elements are mounted on the main body unit 102 of FIG. 4.

As to the oscillation frequency of the carrier wave oscillator 409, a frequency is selected which does not give interference to original objects of electronic appliances utilizing electromagnetic waves such as a radio receiver and a portable telephone, and also which is not adversely influenced by these electronic appliances. As explained in this embodiment 1, if the use frequency of approximately 5 GHz is selected, then the occupied range is approximately 200 MHz even when data of 100 Mbps is transmitted. Therefore, normally, the portable telephone of this embodiment 1 may be used without any problem in the most opportunity. Apparent from FIG. 6, a −3 dB band of the energy ratio "$S_{21}$" corresponds to 400 MHz. Thus, even if a narrow band is realized by employing such a small antenna, then there is a sufficient margin in the frequency band.

Since the above-described structure is employed, the display data can be transmitted to the display member in the wireless manner, and also, the following problems which are conspicuously revealed in connection with enlarging of the display body can be eliminated. That is, caused by the data transmission in the wire manner, for instance, power consumption, restrictions of wiring positions, EMI controls, securing of reliability, and so on. In particular, even when such a transmitter capable of radiating extremely strong electromagnetic waves is present within the same system, a superior system can be supplied without being adversely influenced by interference.

Embodiment 2

Figure 9:
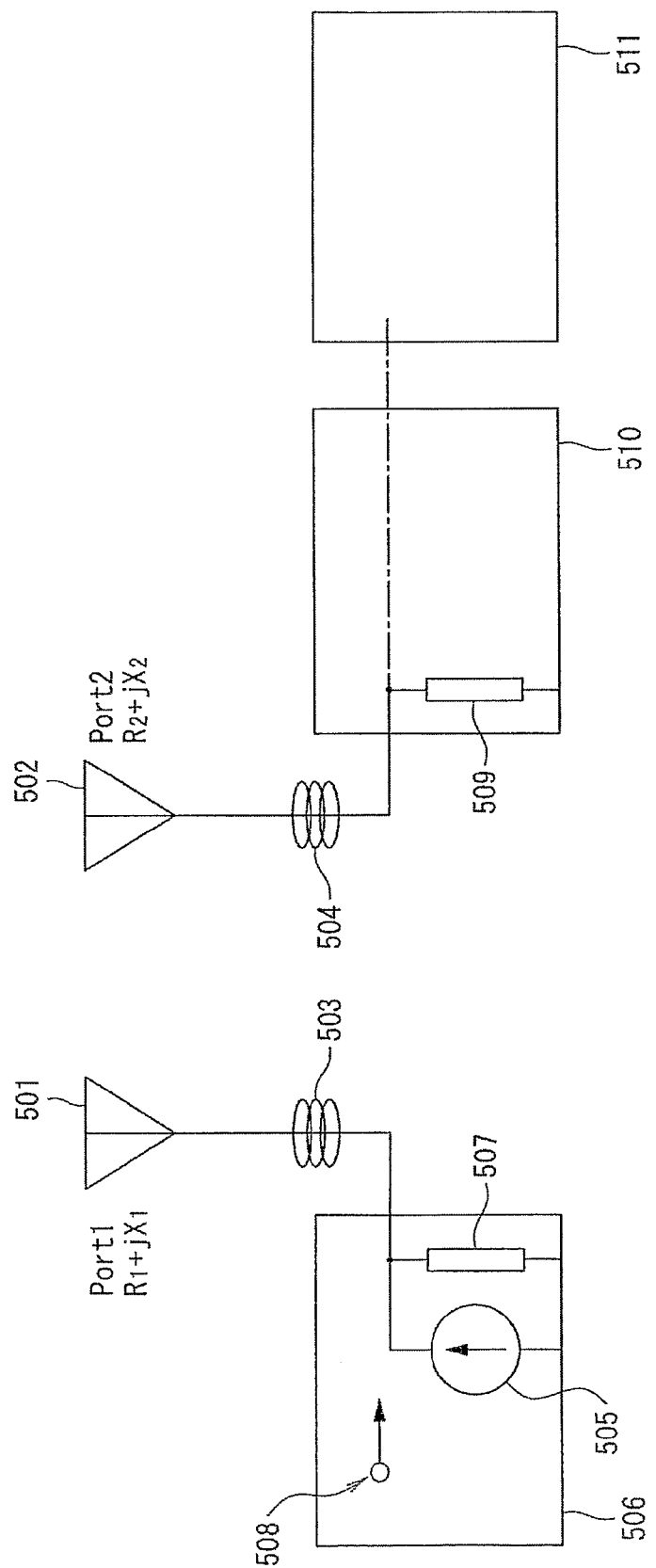
FIG. 9 is a diagram for explaining another embodiment of the present invention.

FIG. 9 is a diagram for exemplifying a major unit of a conceptional idea as to an electronic appliance according to another embodiment of the present invention.

In FIG. 9, reference numeral 501 indicates an internal appliance communication-purpose transmission antenna which corresponds to the transmission antenna 103 of FIG. 4. Also, reference numeral 502 shows an internal appliance communication-purpose reception antenna which corresponds to the reception antenna 104 of FIG. 4. Since these antennas 501 and 502 correspond to small antennas, reactance components of radiation impedance are large and are expressed as "$R_1+jX_1$" and "$R_2+jX_2$", respectively. Normally, in the small antennas, the reactance components "$X_1$" and "$X_2$" are capacitive and own negative values. These reactance components $X_1$ and $X_2$ may be offset by additionally employing inductance elements 503 and 504, which have values that these reactance components $X_1$ and $X_2$ become zero in a use frequency. Normally, since circuit wiring lines and the like own stray inductances, these stray inductances may be contained in a portion of the inductance elements 503 and 504.

The stray reactance components can be offset in the above-described manner which have lowered the efficiency of the conventional circuit, so that the system having the higher efficiency and the superior characteristic can be realized. Reference numeral 508 indicates an input terminal for inputting a signal from a transmitter output circuit. An impedance converting operation is carried out by a matching circuit 506 so as to establish a matching condition in such a manner that an equivalent output impedance 507 of this matching circuit 506 becomes "$R_1$." It should also be noted that both the matching circuit 506 and the inductance 503 are formed with the transmitter output circuit in an integral form to be designed under the normal condition. The inductance 503 may be designed by considering the stray reactance components such as a wiring inductance. Reference numeral 505 indicates a current source as an equivalent drive source, as viewing the transmitter output from the antenna side. While a real part "$R_1$" of a radiation impedance of a small antenna is a small value, the output impedance 507 can be hardly made coincident with this real part "$R_1$." However, this difficulty may give a convenience. This reason is given as follows. If the real part $X_1$ is completely matched with the output impedance 507, then the efficiency of the transmitter becomes excessively high, and the radiation electromagnetic field becomes excessively strong, so that the electromagnetic waves are radiated outside the system as spurious radiation. Since this circuit portion is brought into a mismatching condition, excessive radiation can be avoided.

Also, since the output impedance may effect Q of the antenna range to be lowered, it is possible to avoid that the transmission frequency range becomes excessively narrow due to the compact size of the antenna. Also, to the reception antenna 502, an inductance 504 is additionally provided as a reactance element capable of offsetting the reactance component of this reception antenna. Reference numeral 510 shows a matching circuit, and an input impedance 509 thereof as viewed from the antenna side in the use frequency is designed in such a manner that this input impedance 509 becomes "$R_2$." The matching circuit 510 is designed by considering a stray reactance and a characteristic of an input filter. The output signal of the matching circuit 510 is transmitted to an internal appliance communication-purpose reception unit 511.

All of these circuit elements except for the antenna radiator may be integrated on a semiconductor integrated circuit so as to be made compact and in low cost. In this case, although the sufficiently superior characteristic could not be conventionally achieved since the inductance of the bonding wire causes the disturbance, in accordance with this system of the present invention, such a stray inductance component may be used as a portion capable of offsetting the radiation reactance component of the antenna, so that the adverse influence by the bonding wire can be removed, and the electronic appliance having the better characteristic can be made compact and in low cost. It should also be noted that the S parameter characteristic shown in FIG. 6 illustratively represents a case that the matching condition is established in the manner as explained in this embodiment 2.

Embodiment 3

Figure 10:
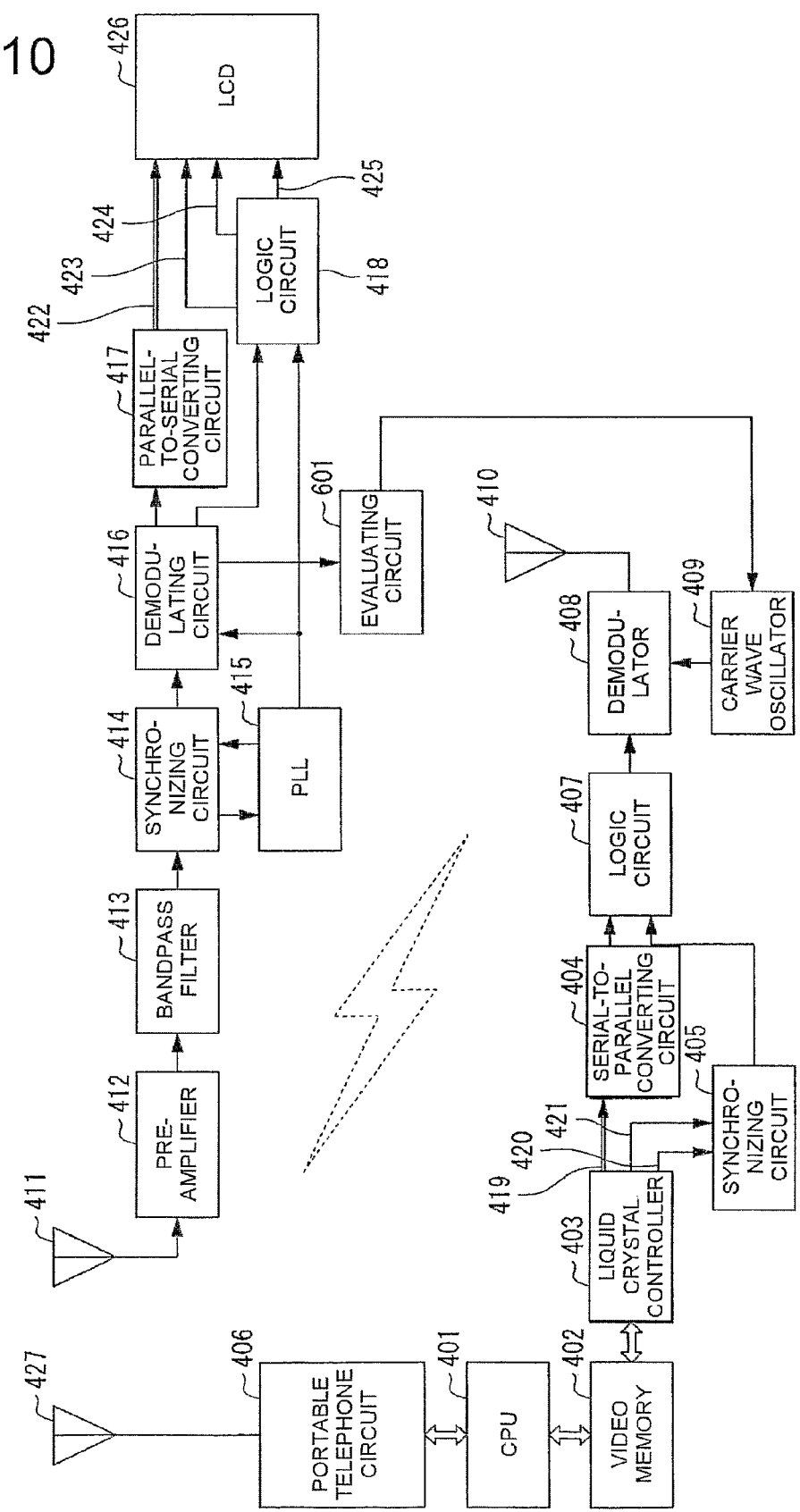
FIG. 10 is a diagram for explaining a further embodiment of the present invention.

FIG. 10 is a block diagram for showing an arrangement of an electronic apparatus according to a further embodiment of the present invention. Since circuit blocks having the same reference numerals as those of FIG. 8 are the same as those of FIG. 8, explanations thereof are omitted. These circuit blocks may be integrated on a semiconductor integrated circuit so as to be made compact and in low cost. In this case, an internal appliance communication-purpose transmission/reception antenna may offset a reactance component and may be operated in a narrow frequency band in accordance with the method as shown in FIG. 9. At this time, an adverse influence caused by an inductance component of a bonding wire which connects the integrated circuit with the antenna could be eliminated in accordance with the above-described method. However, these fluctuations may appear as fluctuations of frequency selection characteristic between the transmission antenna and the reception antenna. It is a cumbersome work to control these fluctuations in higher precision. This embodiment 3 exemplifies a measure for this cumbersome work.

That is to say, an evaluating circuit 601 evaluates an output of the demodulating circuit 416 of the internal appliance communication-purpose receiving circuit based upon, for instance, an error rate and a signal strength. Then, this evaluating circuit 601 feeds back the evaluated output to the carrier wave oscillator 409 of the internal appliance communication-purpose transmission circuit, and changes the oscillation frequency thereof so as to select an optimum frequency with respect to the internal appliance communication. Changing of the frequency may be easily realized by changing a frequency dividing ratio of a frequency dividing circuit, or by utilizing such a technique of a voltage-controlled oscillator and a PLL. While the positional relationship between the transmission and the reception is fixed in the internal appliance communication, since the strengths of the radiated electromagnetic waves are very weak and do not conflict with the frequency allowable deviation rule of the radio wave control law, the internal appliance communication may be freely changed. Alternatively, since the signals for the feedback purpose are present within the same appliance for transmission/reception operations, these signals may be transmitted by way of wire signals. As a result, the signal path for the feedback operation is not required to be operable in the wireless manner, and thus the circuit may be simplified.

In accordance with the present invention, the system having the high reliability can be realized in the easy manner or in the low cost, while permitting the deviation caused by the fluctuations based upon the wiring line and the semiconductor integrated circuit process.

INDUSTRIAL APPLICABILITY

The present invention is not limited only to the signal connections between the main body unit and the display unit within the portable telephones, but may be applied to various sorts of systems that a plurality of wireless systems are mutually provided within the same appliance, for example, a system in which a wireless LAN is built. Conversely, the present invention may be utilized in an appliance that an internal appliance communication is mutually carried out with a receiver for receiving very low-leveled electromagnetic waves such as a portable TV and a GPS terminal equipped with a display member, whereby the inventive idea may be utilized in order to eliminate the adverse influences given to the original appliance communications, which are caused by the internal appliance communication.

The invention claims is:

1. An electronic apparatus comprising:
a first transmission unit that performs a first communication by a first electromagnetic wave;
a second transmission unit that performs a second communication by a second electromagnetic wave;
a reception unit that receives said second electromagnetic wave from said second transmission unit; and
an antenna including a radiator that defines a sphere, where the diameter of the sphere is smaller than $1/(2\pi)$ of a wavelength of said second electromagnetic wave.

2. An electronic apparatus, as claimed in claim 1 wherein said antenna further comprises a reactance element that cancels a reactance component of said radiator.

3. An electronic apparatus, as claimed in claim 1 wherein:
said first transmission unit, said second transmission unit, or either a partial circuit or all circuits of said reception unit are constructed on a semiconductor integrated circuit; and
either a portion or all of reactance components of the radiator are canceled by both a reactance component of a wiring line on said semiconductor integrated circuit, and a reactance component of a wiring line between said semiconductor integrated circuit and the radiator.

4. An electronic apparatus as claimed in claim 1, wherein:
said radiator has a line shape.

5. An electronic apparatus as claimed in claim 1, wherein:
said radiator comprises a printed pattern on a printed circuit board.

6. An electronic apparatus comprising:
a first transmission unit that performs a first communication by a first electromagnetic wave;
a second transmission unit that performs a second communication by a second electromagnetic wave;
a reception unit that receives said second electromagnetic wave;
an antenna including a radiator that defines a sphere, where the diameter of the sphere is smaller than $1/(2\pi)$ of a wavelength of said second electromagnetic wave;
an evaluation unit that evaluates a reception condition of said reception unit;
a control unit that controls a frequency of said second electromagnetic wave; and
a feedback unit that feeds back an evaluation result made by said evaluation unit to said control unit.

7. A wireless communication terminal comprising:
a first housing unit;
a second housing unit;
a coupling unit that couples said first housing unit to said second housing unit in such a manner that a positional relationship between said first housing unit and said second housing unit is changeable;

an external wireless communication-purpose antenna mounted on either said first housing unit or said second housing unit;

an external wireless communication control unit mounted on said first housing unit, that controls an external wireless communication performed via said external wireless communication-purpose antenna;

a display unit mounted on said second housing unit;

a first internal wireless communication control unit mounted on said first housing unit, that controls an internal wireless communication executed between said first housing unit and said second housing unit;

a second internal wireless communication control unit mounted on said second housing unit, that controls an internal wireless communication executed between said first housing unit and said second housing unit;

a first internal wireless communication-purpose antenna mounted on said first housing unit, that includes a radiator defining a first sphere, where the diameter of the first sphere is smaller than $1/(2\pi)$ of a wavelength of an electromagnetic wave used in said internal wireless communication;

a second internal wireless communication-purpose antenna mounted on said second housing unit, that includes a radiator defining a second sphere, where the diameter of the second sphere is smaller than $1/(2\pi)$ of the wavelength of the electromagnetic wave used in said internal wireless communication; and an internal wireless timing control unit that controls transmission timing of the electromagnetic wave used in said internal wireless communication based upon transmission timing of an electromagnetic wave transmitted via said external wireless communication-purpose antenna.

* * * * *